2,799,683
Patented July 16, 1957

2,799,683

PREPARATION OF 2-AMINO-5-ALKYL-1,3,4-THIADIAZOLES

John Song, North Plainfield, N. J., assignor to American Cyanamid Company, New York, N. Y., a corporation of Maine No Drawing. Application October 27, 1955, Serial No. 543,277

8 Claims. (Cl. 260—306.8)

This invention relates to a process for preparing 2-amino-1,3,4-thiadiazoles, which may be substiuted in the 5 position by an alkyl group, by the reaction of thiosemicarbazide and an aliphatic acid, in the presence of polyphosphoric acid, and more particularly, also in the presence of hypophosphorous acid.

2 - amino - 1,3,4 - thiadiazole and 2 - amino - 5 - alkyl-1,3,4 - thiadiazoles are known to be effective therapeutic agents, and accordingly their economical production is highly desirable.

For the manufacture of the 2-amino-5-alkyl-1,3,4-thiadiazoles, several methods have been used including the reaction of thiosemicarbazide and a fatty acid in the presence of sulfuric acid, or by the reaction of a fatty acid chloride and thiosemicarbazide. This last reaction is described at length in a patent to Steahly, 2,422,050, Method of Making 2-Amino-5-Substituted-1,3,4-Thiadiazole.

In the past, however, yields have been poor, or expensive intermediates have been required, or the time required has been uneconomically long.

It has now been found that by heating thiosemicarbazide with an aliphatic acid in the presence of polyphosphoric acid a good yield of high quality 2-amino-1,3,4-thiadiazole, in which the 5 position may have an alkyl substitutent, is produced in a short time, and under conditions which are commercially practical. Not only are the yields high, but the quality and purity of the product is also excellent. Comparatively short heating periods are necessary, usually in the order of from one to two hours at a temperature of between about 100° C. and 120° C., although for formic acid a temperature of about 88° C. to 100° C. is preferred to avoid volatilization. For isolation of the thiadiazole, the reaction mixture is drowned in water and neutralized with an alkaline reagent which liberates the thiadiazole. Ammonium hydroxide is particularly convenient for the neutralization as the ammonium phosphates are soluble and therefore easily separable from the product.

As to the aliphatic acids which may be used, a wide selection is operable. The 5 substituent on the final 2-amino-1,3,4-thiadiazole corresponds to the chain attached to the carboxy group. Surprisingly, the present synthesis is effective with formic acid which leaves a hydrogen in the 5 position as well as higher acids such as acetic acid which leaves a methyl group in the 5 position; propionic acid which leaves an ethyl group in the 5 position; butyric acid which leaves a propyl group in the 5 position; etc.

The heating period varies inversely with the temperature. Temperatures below about 100° C. usually require an uneconomically long reaction period and may cause stirring difficulties, even though the reaction proceeds at these lower temperatures. The temperature should not be so high that an undue quantity of the acid is volatilized. From about a stoichiometric quantity to 1.5 mols of the aliphatic acid per mol of thiosemicarbazide is preferred. A wider ratio may be used but the recoveries are less economical.

The polyphosphoric acid is the ordinary polyphosphoric acid of commerce which contains from 82 to 84% of $P_2O_5$. If available, a strength of from about 80 to 89% $P_2O_5$ gives effective results and may be used. Sufficient polyphosphoric acid is used to result in a stirrable mixture at the heating temperature. At least about two parts by weight of polyphosphoric acid per part of thiosemicarbazide is preferred and slightly more than this is more easily stirrable. Proportions of polyphosphoric acid considerably in excess of this proportion may be used, but add only to the cost without corresponding advantages.

A small amount of hypophosphorous acid may be added to the mixture since the addition of hypophosphorous acid surprisingly gives an improvement in yield. Up to about 5% of a 50% solution of hypophosphorous acid is economical although about 1% based on the quantity of thiosemicarbazide is particularly advantageous under present economic conditions.

In the following examples which illustrate this invention parts are by weight unless otherwise specified.

EXAMPLE 1

*2-amino-5-ethyl-1,3,4-thiadiazole*

A mixture is prepared of 92.6 parts of propionic acid, 215 parts of commercial polyphosphoric acid, and 1 part of 50% aqueous hypophosphorous acid, to which is added 91 parts of thiosemicarbazide. The reaction mixture is heated with stirring to between 102° C. and 111° C. for 1½ hours at which time the reaction is substantially complete. The reaction mixture is drowned in 500 parts of water and neutralized with ammonium hydroxide. The reaction mixture is filtered at room temperature, and the cake of 2-amino-5-ethyl-1,3,4-thiadiazole washed with water and dried. 114.3 parts are obtained, which is a yield of about 92.5%.

EXAMPLE 2

*2-amino-5-methyl-1,3,4-thiadiazole*

The procedure of Example 1 is followed except that 75 parts of acetic acid is used in lieu of propionic acid and the mixture is heated at 105° C. to 116° C. for 50 minutes. 102.4 parts of 2-amino-5-methyl-1,3,4-thiadiazole is obtained which corresponds to a yield of 89.1%.

EXAMPLE 3

*2-amino-5-propyl-1,3,4-thiadiazole*

The procedure of Example 1 is followed except that 111 parts of n-butyric acid is used in lieu of the propionic acid. The product obtained is 2-amino-5-propyl-1,3,4-thiadiazole.

EXAMPLE 4

*2-amino-5-isobutyl-1,3,4-thiadiazole*

The procedure of Example 1 is followed except that 127 parts of isovaleric acid is used in lieu of the propionic acid. The product obtained is 2-amino-5-isobutyl-1,3,4-thiadiazole.

EXAMPLE 5

*2-amino-1,3,4-thiadiazole*

54 parts of 90% formic acid and 250 parts of polyphosphoric acid are mixed and to the mixture is added one part of 25% sodium di-(ethylhexyl)-sulfosuccinate to control foaming. 91 parts of thiosemicarbazide is added and the mixture heated at between about 88° C. and 101° C. for 65 minutes. The temperature must be held comparatively low to avoid undue volatilization of the formic acid. The reaction mixture is cooled to 72°

C. and thereto is added 250 parts of cold water. The reaction mixture is treated with one part of decolorizing carbon, filtered, then neutralized with 475 parts of concentrated ammonia. The mixture is chilled to about 20° C., filtered and the cake of 2-amino-1,3,4-thiadiazole washed with water and dried. A yield of 61.8 parts is obtained. This is a yield of about 71% which is comparatively low because the reaction is conducted at a comparatively low temperature.

I claim:

1. A process for preparing a 2-amino-1,3,4-thiadiazole which comprises heating thiosemicarbazide with at least about a stoichiometric quantity of an alkanoic acid in the presence of at least about 2 parts of polyphosphoric acid per part of thiosemicarbazide.

2. In the process of preparing a 2-amino-1,3,4-thiadiazole by the reaction of thiosemicarbazide and an alkanoic acid, the improvement which comprises using polyphosphoric acid as the reaction medium.

3. The process of claim 1 in which the reaction is conducted in the presence of hypophosphorous acid.

4. The process of claim 1 in which 2-amino-5-ethyl-1,3,4-thiadiazole is prepared from propionic acid.

5. The process of claim 1 in which 2-amino-5-methyl-1,3,4-thiadiazole is prepared from acetic acid.

6. The process of claim 1 in which 2-amino-5-propyl-1,3,4-thiadiazole is prepared from n-butyric acid.

7. The process of claim 1 in which 2-amino-5-isobutyl-1,3,4-thiadiazole is prepared from isovaleric acid.

8. The process of claim 1 in which 2-amino-1,3,4-thiadiazole is prepared from formic acid.

References Cited in the file of this patent

UNITED STATES PATENTS 2,497,825    Steahly _____ Feb. 14, 1950

OTHER REFERENCES

Wojahn et al.: Chem. Abstracts, vol. 46, col. 5040 (1952).

Ban Chem. Abstracts, vol. 48, col. 10741 (1954).

Bambas: "Heterocyclic Compounds" (Interscience), pp. 103–113 (1952).